(12) United States Patent
Wang et al.

(10) Patent No.: US 8,718,161 B2
(45) Date of Patent: May 6, 2014

(54) METHOD FOR TRANSMITTING PILOT SIGNAL IN MULTI-CARRIER WIRELESS TRANSMISSION SYSTEM

(75) Inventors: Hai Wang, Beijing (CN); Kaushik Josiam, Dallas, TX (US); Qi Wu, Beijing (CN); Zhouyue Pi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/497,786

(22) PCT Filed: Sep. 16, 2010

(86) PCT No.: PCT/KR2010/006348
§ 371 (c)(1),
(2), (4) Date: Jul. 9, 2012

(87) PCT Pub. No.: WO2011/037362
PCT Pub. Date: Mar. 31, 2011

(65) Prior Publication Data
US 2012/0263254 A1    Oct. 18, 2012

(30) Foreign Application Priority Data
Sep. 22, 2009    (CN) .......................... 2009 1 0178694

(51) Int. Cl.
*H04K 1/10*    (2006.01)
(52) U.S. Cl.
USPC ........... 375/260; 375/259; 375/295; 370/330; 370/203; 370/210; 370/437; 370/478
(58) Field of Classification Search
USPC .......... 375/260, 259, 295; 370/330, 203, 210, 370/437, 478; 455/452.1
See application file for complete search history.

(56) References Cited

U.S. PATENT DOCUMENTS

| 2005/0243939 A1 | 11/2005 | Jung et al. | |
| 2009/0245197 A1* | 10/2009 | Ma et al. | 370/330 |
| 2009/0257520 A1* | 10/2009 | Lin et al. | 375/260 |
| 2010/0177732 A1* | 7/2010 | Watanabe et al. | 370/330 |

FOREIGN PATENT DOCUMENTS

KR    10-2006-0035941    4/2006

OTHER PUBLICATIONS

International Search Report dated May 25, 2011 in connection with International Patent Application No. PCT/KR2010/006348.
Written Opinion of International Searching Authority dated May 25, 2011 in connection with International Patent Application No. PCT/KR2010/006348.
R1-050786, "On Pilot Patterns in MIMO OFDMA Transmissions in E-UTRA", 3GPP TSG RAN WG1 Meeting #42, London, United Kingdom, Aug. 29-Sep. 2, 2005, pp. 1-6.
R1-050839, "Pilot Patterns in OFDM LTE Downlink", 3GPP TSG RAN WG1 Meeting #42, London, United Kingdom, Aug. 29-Sep. 2, 2005, 9 pages.

* cited by examiner

*Primary Examiner* — Zewdu Kassa (57) ABSTRACT

The present invention provides a method for transmitting pilots in a multi-carrier wireless transmission system. A wireless time-frequency transmission block is composed of N consecutive OFDM symbols in time domain and M consecutive physical sub-carriers in frequency domain, N and M are integers those are greater than or equal to 1. The method includes: partitioning the wireless time-frequency transmission block into several areas, and determining the position of pilots, of which the total number is a preset number, according to the time-frequency domain balancing principle of pilots of various antennas in various areas; inserting pilots at the pilot positions of each antenna corresponding to the antenna for transmission. In accordance with the present invention, the simultaneous transmission of multiple antennas is supported in a wireless time-frequency transmission block of a multi-carrier wireless transmission system.

20 Claims, 9 Drawing Sheets

METHOD FOR TRANSMITTING PILOT SIGNAL IN MULTI-CARRIER WIRELESS TRANSMISSION SYSTEM

CROSS-REFERENCE TO RELATED APPLICATION(S)

The present application claims priority under 35 U.S.C. §365 to International Patent Application No. PCT/KR2010/006348 filed Sep. 16, 2010, entitled "METHOD FOR TRANSMITTING PILOT SIGNAL IN MULTI-CARRIER WIRELESS TRANSMISSION SYSTEM". International Patent Application No. PCT/KR2010/006348 claims priority under 35 U.S.C. §365 and/or 35 U.S.C. §119(a) to Chinese Patent Application No. 200910178694.7 filed Sep. 22, 2009, and which are incorporated herein by reference into the present disclosure as if fully set forth herein.

TECHNICAL FIELD

The present invention relates to multi-carrier wireless transmission technologies, and more particularly to a method for transmitting pilots in a multi-carrier wireless transmission system.

BACKGROUND ART

A multi-carrier wireless transmission system is implemented based on an Orthogonal Frequency Division Multiplexing (OFDM) technology. The OFDM, served as a high-speed transmission technology for combating multi-path fading, partitions channels into many orthogonal sub-channels in frequency domain; the carriers of various sub-channels keep orthogonal; a high-speed data flow is transmitted at a low bit rate after being converted to such orthogonal and parallel multiple sub-carriers by serial-to-parallel conversion.

Since a wireless channel is always a fading channel, it is necessary for inserting pilots in the sent data signals according to a preset pilot format in a multi-carrier wireless transmission system, so that the receiving party can perform the real-time estimation and tracking for the channel according to the received pilot signal. A pilot is a signal known by a receiving party. If no explicitly express, a pilot may be call as a pilot signal in this present invention.

Figure 1:
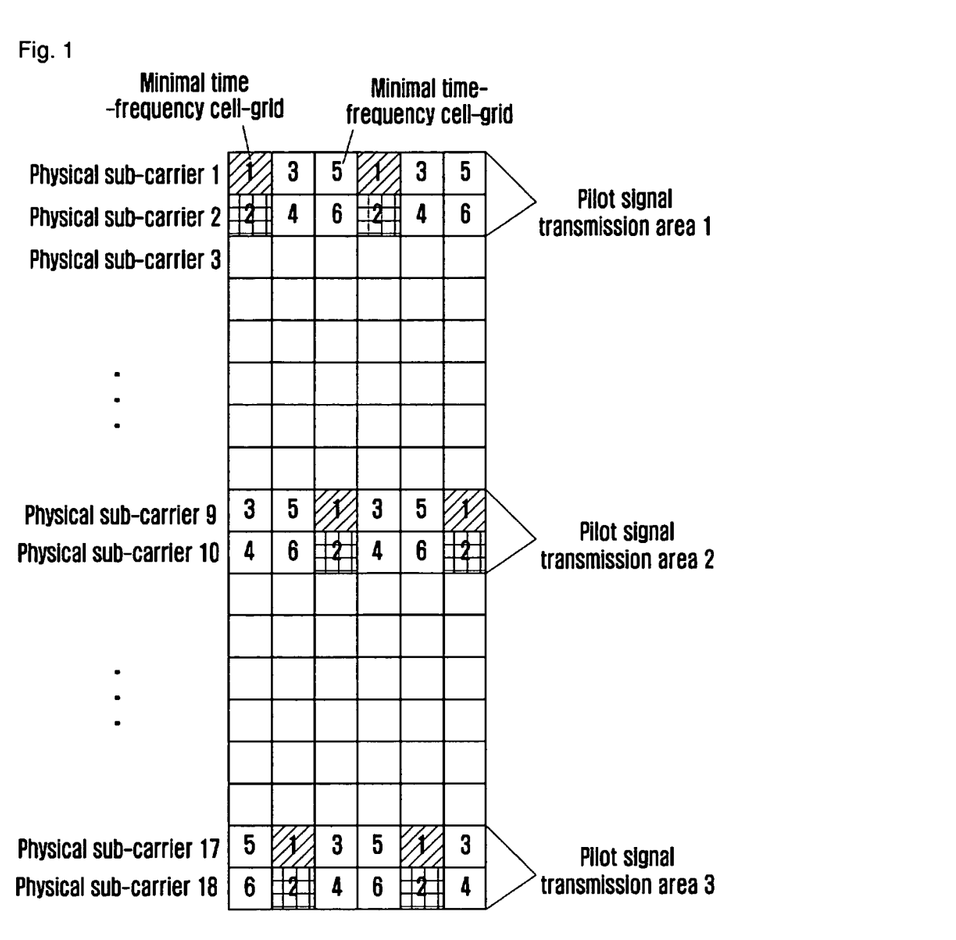
FIG. 1 is a schematic diagram illustrating a wireless time-frequency transmission block and pilot format of multi-carrier wireless transmission system in the prior art.

FIG. 1 is a schematic diagram illustrating a wireless time-frequency transmission block and pilot format of multi-carrier wireless transmission system in the prior art. Referring to FIG. 1, in the present multi-carrier wireless transmission system such as mobile WiMAX evolution system, a data transmission unit sent by each sector/cell is a wireless time-frequency transmission block as shown in FIG. 1; the wireless time-frequency transmission block is composed of six consecutive OFDM symbols in time domain (horizontal axis direction) and eighteen consecutive physical sub-carriers in frequency domain (longitudinal axis direction).

In the prior art, a pilot format is designed for the wireless time-frequency transmission block as shown in FIG. 1. The pilot format is that, three pilot signal transmission areas (each pilot signal transmission area occupies two physical sub-carriers) are set in a wireless time-frequency transmission block of each sector/cell; in each pilot signal transmission area, each antenna of sector/cell sends two pilot signals of the antenna by use of two minimal time-frequency cell-grids (the minimal time-frequency cell-grid is a minimal unit of wireless transmission resource composed of one OFDM symbol and one physical sub-carrier, e.g. an area marked 1 in FIG. 1 is a minimal time-frequency cell-grid and an area marked 5 is also a minimal time-frequency cell-grid). For example, FIG. 1 is a schematic diagram for transmitting signals by use of a wireless time-frequency transmission block. The wireless time-frequency transmission block includes three pilot signal transmission areas; pilot signals of antennas 1-6 of sector/cell 1 are respectively transmitted by minimal time-frequency cell-grids marked with 1-6; in the case that three adjacent cells constructs a cell group, cell 1 may transmit pilot signals of antennas 1-2 respectively by use of minimal time-frequency cell-grids marked with 1-2, cell 2 may transmit pilot signals of antennas 1-2 respectively by use of minimal time-frequency cell-grids marked with 3-4, and cell 3 may transmit pilot signals of antennas 1-2 respectively by use of minimal time-frequency cell-grids marked with 5-6. If there are multiple antennas in a cell, to avoid the interference, minimal time-frequency cell-grids occupied by various antennas are usually non-overlapping, as stated above. In addition, as shown in FIG. 1, pilot signals of antenna 1 may be referred to as pilot flow 1; in a similar way, pilot signals of antenna 2 may be referred to as pilot flow 2.

In fact, in an existing multi-carrier wireless transmission system, when there are multiple cells necessary for transmitting pilot signals and supporting multiple antenna transmission, and such cells are adjacent or overlapping, to reduce the interference to each other, minimal time-frequency cell-grids occupied by various antennas of various cells are usually non-overlapping, i.e. various pilot flows of various cells are non-overlapping. It is because that, the existing pilot signals transmission method is used for transmitting pilot signals of single cell. For a downlink, a receiving party estimates the condition of the downlink come from the local base station of cell by use of pilot signals. Along with the evolution of wireless transmission system, however, more and more services and requirements will be achieved; some services provide the different requests for transmission of pilot signals. In a shared frequency network, for example, in a multicast broadcast service based on multiple cells, since the information sent by multiple base stations are available information, and even the same information, such information should be merged and received to acquire the diversity gain, which is not the same as the case of the above single cell transmission in which the information come from other base stations are regarded as interferences and are eliminated as far as possible. However, when the merged information come from multiple base stations is used as the downlink information, the corresponding downlink condition is relatively complicated; therefore, it is necessary for a better channel estimation, i.e. it provides a higher request for the design of the corresponding pilot signal. At present, there no a better design scheme of pilot signal for solving such a problem.

Figure 3:
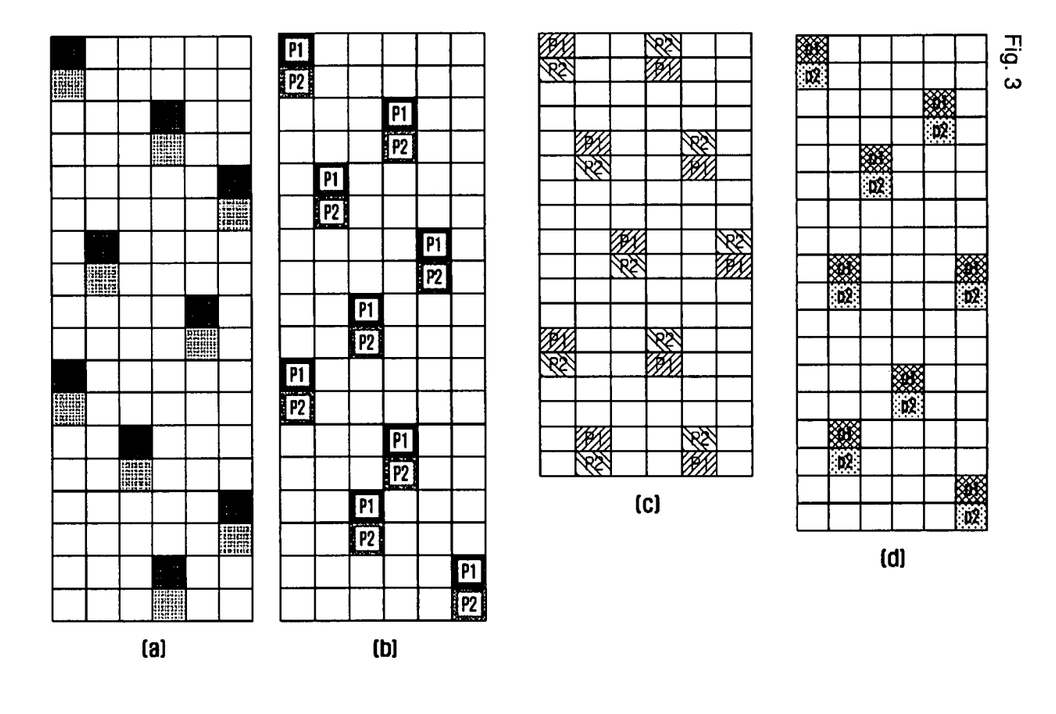
FIGS. 3(a), 3(b), 3(c) and 3(d) are some others pilot transmission schemes in the prior art.
Figure 4:
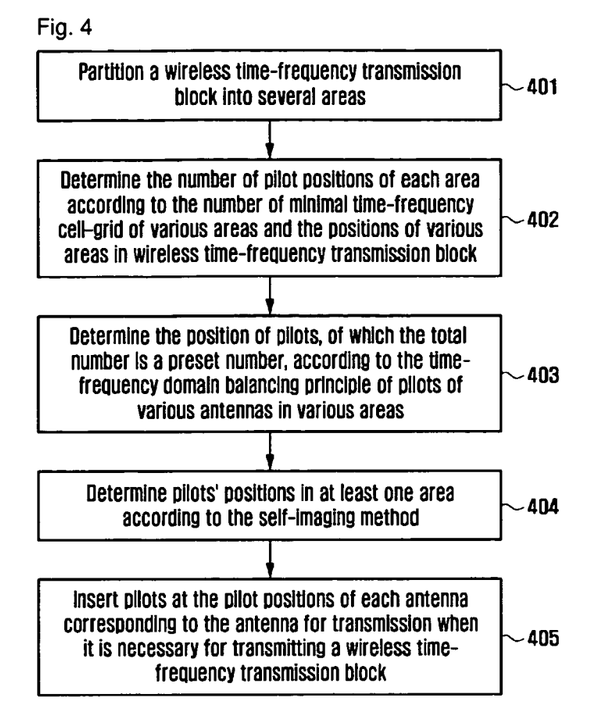
FIG. 4 is a flowchart illustrating a method for transmitting pilot signals in a multi-carrier wireless transmission system in accordance with a first embodiment of the present invention.

In addition, in a multi-carrier wireless transmission system, the existing pilot signal transmission method is obviously asymmetric in the time-frequency domain. For example, in a wireless time-frequency transmission block as shown in FIG. 3(*b*), pilot flow 1 uses minimal time-frequency cell-grid marked as 1, transmits two pilot signals at the first OFDM symbol (the first column from the left), and transmits one pilot signals at the sixth OFDM symbol (the first column from the right) symmetrical along time domain, i.e. it is obviously asymmetric in time domain. Such an asymmetry makes the channel estimation algorithm more complicated, as a result that it is difficult to implement the channel estimation.

Moreover, in a multi-carrier wireless transmission system, the existing pilot signal transmission method doesn't utilize the edge of wireless time-frequency transmission block adequately. For example, in a wireless time-frequency transmission block as shown in FIG. 3(d), pilot flow 1 transmits three pilot signals at the first and the sixth OFDM signals at the edge of time domain by use of minimal time-frequency cell-grid marked with 1; in fact, more pilot signals such as four pilot signals are transmitted, the better the effect is. As shown in FIG. 3(d), since the edge of wireless time-frequency transmission block isn't utilized adequately, the channel estimation of pilot flow 1 at the minimal time-frequency cell-grid of (1,9), i.e. Column 1 Row 9, has to use an extrapolation algorithm, which obviously prejudices the accuracy of channel estimation and increases the implementation complexity.

DISCLOSURE OF INVENTION

Technical Problem

In view of the above, the objective of the present invention is to provide a method for transmitting pilots in a multi-carrier wireless transmission system, so as to improve the accuracy of channel estimation.

Solution to Problem

To achieve the above objective, the scheme of the present invention is given as follows.

The present invention provides a method for transmitting pilots in a multi-carrier wireless transmission system, a wireless time-frequency transmission block is composed of N consecutive OFDM symbols in time domain and M consecutive physical sub-carriers in frequency domain, N and M are integers those are greater than or equal to 1, the method comprising:

Partitioning the wireless time-frequency transmission block into several areas, and determining the position of pilot signals, of which the total number is a preset number, according to the time-frequency domain balancing principle of pilot signals of various antennas in various areas;

inserting pilots at the pilot signal positions of each antenna corresponding to the antenna for transmission.

Preferably, the step for partitioning the wireless time-frequency transmission block into several areas comprises: if M is greater than N, the partition is performed along the frequency domain; otherwise, if N is greater than M, the partition is performed along the time domain.

Preferably, the step for partitioning the wireless time-frequency transmission block into several areas further comprises: partitioning the wireless time-frequency transmission block, so that the partitioned area has symmetry.

Preferably, the partitioned area tends to square in comparison to the wireless time-frequency transmission block.

Preferably, the method for determining the position of pilot signals, of which the total number is a preset number, according to the time-frequency domain balancing principle of pilot signals of various antennas in various areas comprises: determining the pilot signal position of each area according to the time-frequency balancing principle of pilot signals of various antennas in the area, with considering the time-frequency balancing principle of other various areas.

Preferably, before determining the pilot signal position, the method further comprising: determining the number of pilot signal positions of each areas according to the number of minimal time-frequency cell-grid of various areas and the positions of various areas in the wireless time-frequency transmission block.

Preferably, the method for determining the pilot signal position comprises: determining the pilot signal position at the edges of various areas.

Preferably, if the partition is along the frequency domain, it is necessary for determining pilot positions at the edge of time domain of the partitioned area in advance, and then determining the pilot signal positions at the edge of frequency domain; if the partition is along the time domain, it is necessary for determining pilot positions at the edge of frequency domain of the partitioned area in advance, and then determining the pilot signal positions at the edge of time domain.

Preferably, the method further including: after the edges of wireless time-frequency transmission blocks or the partitioned areas are set pilot signals, the further appropriate position will be selected according to the time-frequency domain balancing principle.

Preferably, the further appropriate position is the center of the area or 1 time edge of the area; If the further appropriate position is the center of area, the following further appropriate position is 1 time edge of area, then the yet further appropriate position is 2 time edge of area, and then the yet further appropriate position is 3 time edge of area, and so on, until all positions of pilot signals are determined; if the further appropriate position is 1 time edge of area, the following further appropriate position may be the center of area or 2 time edge of area, and so on, until all positions of pilot signals are determined.

Preferably, the method for determining the pilot signal position further comprises: determining the pilot signal position according to the self-imaging method at least in an area.

Preferably, the self-imaging method comprises: time domain self-imaging method, frequency domain self-imaging method and time-frequency domain self-imaging method;

The method for determining the pilot signal position further comprises: for each area of the at least one areas, determining the pilot signal position by selecting one of the above time domain self-imaging method, frequency domain self-imaging method and time-frequency domain self-imaging method.

Preferably, the wireless time-frequency transmission block is composed of six consecutive OFDM symbols in time domain and eighteen consecutive physical sub-carriers in frequency domain; the preset number of the pilot signal position is 8, and the pilot signal positions are at least one of the following two groups: {(1,1), (5,3), (3,5), (1,9), (6,9), (4,13), (2,15), 6,17)}, {(1,2), (5,4), (3,6), (1,10), (6,10), (4,14), (2,16), (6,18)}, two digits of the above each pilot signal position respectively represent the coordinate of time domain and frequency domain.

Preferably, the wireless time-frequency transmission block is composed of six consecutive OFDM symbols in time domain and eighteen consecutive physical sub-carriers in frequency domain; the preset number of the pilot signal position is 8, and the pilot signal positions are at least one of the following two groups: {(1,1), (5,3), (2,5), (1,9), (6,9), (5,13), (2,15), 6,17)}, {(1,2), (5,4), (2,6), (1,10), (6,10), (5,14), (2,16), (6,18)}, two digits of the above each pilot signal position respectively represent the coordinate of time domain and frequency domain.

Preferably, the number of pilot signals inserted at each pilot signal position is one, or physically-consecutive a pair or multiple.

Advantageous Effects of Invention

It can be seen that, the present invention has the following advantages.

1. in the present invention, the pilot signal positions of various antennas are determined according to the time-frequency domain balancing principle; therefore, it is possible to guarantee the balancing requirement of time-frequency domain resources of various antennas, thereby improving the service performance.

2. in the present invention, the channel estimation problem for receiving the information sent by multiple base stations based on multicast broadcast services of multiple cells in a shared frequency network is solved by a set of effective mechanism. Many optimal designs are given for reducing the asymmetrical distribution of pilot signal transmission, avoiding the asymmetry, reducing and eliminating the asymmetry among various antennas, and reducing the usage of extrapolation. The pilot designed according to such a method may improve the accuracy of channel estimation and reduce the resource occupied by pilot signals, thereby improving the system performance.

MODE FOR THE INVENTION

A further detailed description is hereinafter given to the present invention with reference to embodiments and accompanying drawings so as to make the objectives, technical solution and merits thereof more apparent.

The present invention provides a method for transmitting pilot signals in a multi-carrier wireless transmission system; in the method, a wireless time-frequency transmission block has any format composed of N consecutive OFDM symbols in time domain and M consecutive physical sub-carriers in frequency domain, which is referred to as composed of row M column N; N and M are integers those are greater than or equal to 1; the wireless time-frequency transmission block with any format is partitioned into several areas; the sum of several areas is the wireless time-frequency transmission block and the several areas are mutually disjoint; when a pilot signal is set in each area, the position is determined according to the time-frequency domain balancing principle of pilot signals of various antennas in various areas and preferentially according to the time-frequency domain balancing principle of the area; when a wireless time-frequency transmission block is transmitted, a pilot signal of each antenna is inserted at the pilot signal position corresponding to the antenna for transmission.

Figure 8:
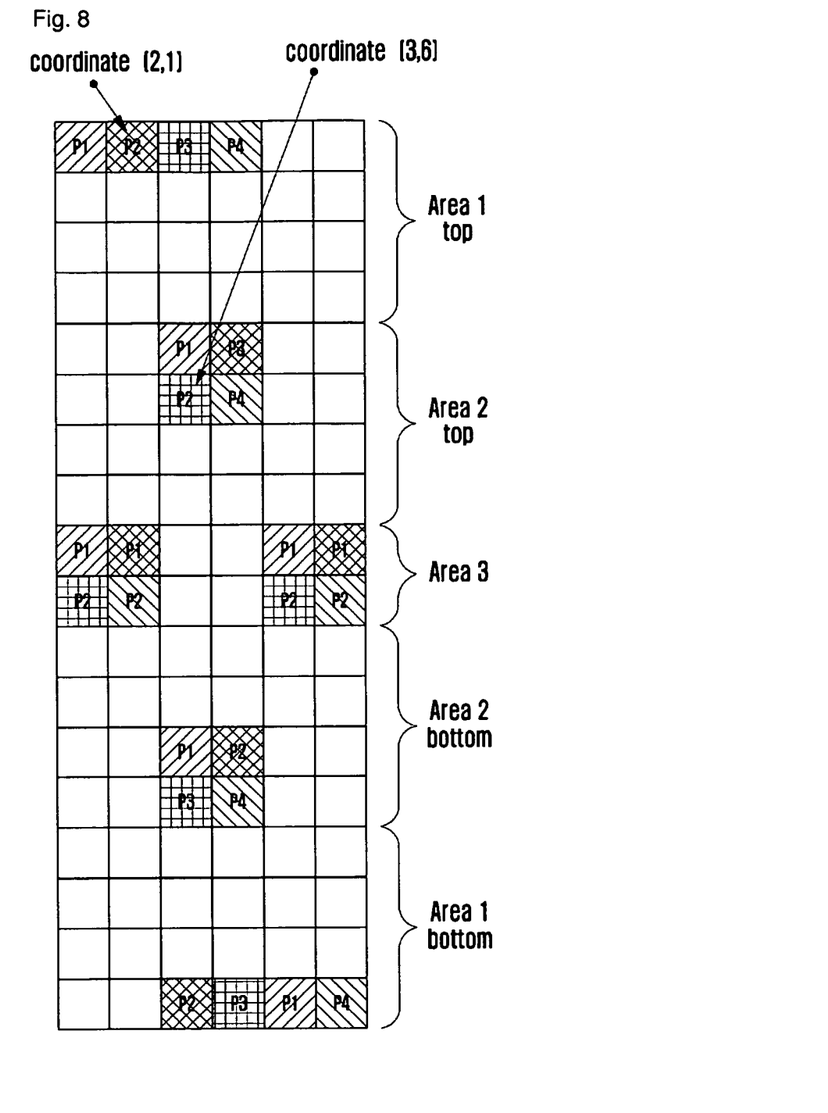
FIG. 8 is a schematic diagram illustrating a pilot format constructed by use of self-imaging method according to the present invention.

In addition, when a wireless time-frequency transmission block is partitioned into several areas; preferably, if M is greater than N, especially M is obviously greater than N, for example, M is twice as much as N or even greater, partition is performed along M, i.e. the frequency domain; otherwise, if N is greater than M, especially N is obviously greater than M, partition is performed along N, i.e. the time domain. The partition has symmetry, which is to reduce the complexity. In the last part of the present invention, the position of pilot signal may be determined by use of its symmetry of area. The so-called symmetry is directed to take the central axis of the time domain or the frequency domain of a wireless time-frequency transmission block as symmetry axis, and a symmetrical minimal time-frequency cell-grid of the area relative to the symmetry axis still belongs to the area, for example, the following area 1 of FIG. 8 is symmetrical relative to the central axis of the frequency domain. The partitioned area tends to square in comparison to the wireless time-frequency transmission block. For example, a wireless time-frequency transmission block of row M column N is partitioned into two areas of row M/2 column N; M/2 is an integer, M/2/N is closer to 1 more than M/N. In addition, the more the partitioned area is closer to square, the better the result is, and the partitioned area is a relative complete and consecutive time-frequency resource block. In general, the number of the partitioned area is 2 or 3. It is considered for such a partition that, in general, the channel estimations of time domain and frequency domain are both important, it is necessary for considering the distributions of time domain and of frequency domain at the same time when a pilot signal is set. If the area, in which a pilot signal is considered to be set, is closer to square, the symmetrical setting may be performed by use of the symmetries of time domain and frequency domain; therefore, there are a lot less factors those should be considered, and it is convenient to simplify the setting process. It should be noted that, it is convenient to simplify the setting process when the partitioned area is closer to square more than the original wireless time-frequency transmission block, which doesn't means that it is the best partition when the area is partitioned into square. The schematic diagram for partitioning into three areas is as shown in FIG. 8; in a wireless time-frequency transmission block of row 18 column 6, three areas are respectively as follows; area 1 includes rows 1-4 and 15-18, area 2 includes rows 5-8 and 11-14, and area 3 includes rows 9-10. The partitioned area is closer to square, which means that the ratio of the partitioned row number and column number is closer to 1 more than the ratio of the row number and column number of the original wireless time-frequency transmission block. For instance, in FIG. 8, the ratio of row number and column number of the partitioned area 1 is 8/6, which is more closer to 1 than the ratio 18/6 of row number and column number of the original wireless time-frequency transmission block; the ratio of row number and column number of the partitioned area 3 is 2/6, which is more closer to 1 than the original ratio of 18/6.

In general, in a communication system, to implement a desired service, there is a preset value of the total number of pilot signals to be sent in the wireless time-frequency transmission block by considering the transmission throughput and the accuracy of channel estimation accuracy; the preset value is an empirical value or a preferred value got by plenty of simulations. In the case of getting the preset value, when a further setting is performed to a pilot signal, the pilot signal is also dispersed to the partitioned several areas based on the consideration of time domain and frequency domain, dispersed according to a proportion preferably; alternatively, the different areas forms the relation of mutual complementation and mutual assistance, that is to say, each area places particular emphasis on its own point; however, the point shouldn't be too partial, for example, it shouldn't only place particular emphasis on the time domain or the frequency domain. The dispersed proportion of pilot signal may be mainly determined according to the number of minimal time-frequency cell-grids of various areas and the positions of various areas in a wireless time-frequency transmission block.

Certainly, if a wireless time-frequency transmission block is a square or is closer to a square, it is needless to partition areas. If it is necessary for partitioning areas, the partitioned areas should be square or closer to square. For example, the "back" shape partition or "field" shape partition is performed.

In addition, when a pilot signal is set in each partitioned area, the position of pilot signal is first determined according to the time-frequency balancing principle of pilot signals of various antennas in the area, and then determined according to the time-frequency balancing principle of other various areas. The so-called time-frequency domain balancing is that, the interval of pilots is not too big or too small in time domain or frequency domain, i.e. pilots are not too sparse or too dense.

In a wireless time-frequency transmission block or partitioned area, minimal time-frequency cell-grids those reside in the different time-frequency domain positions may provide channel estimations with different precisions, for example, minimal time-frequency cell-grids those reside in the edge of wireless time-frequency transmission block is in favor of providing a better channel estimation while the capability of providing channel estimation by minimal time-frequency cell-grids those reside in the center of wireless time-frequency transmission block is relatively bad; moreover, in the case of the same interval, the precision of channel estimation got by interpolation is obviously higher than that got by extrapolation. Therefore, in general, it is expected to assign the positions of some pilot signals at the edge of wireless time-frequency transmission block or partitioned area as far as possible when a specific minimal time-frequency cell-grid is assigned as the position of a pilot signal. As described above, however, it is not the best scheme to assign all pilot signals at the edge; it is because that, the pilot interval of the enter of wireless time-frequency transmission block or area is big or sparse, which breaks the time-frequency domain balancing principle.

Therefore, in a wireless time-frequency transmission block or partitioned area, on the premise of considering the time-frequency domain balancing principle of pilot signals, a pilot signal is set at the edge preferentially. If the partition is along the frequency domain, it is necessary for setting pilots at the edge of time domain of the partitioned area in advance, and then considering to set the pilot signal at the edge of frequency domain; in a similar way, if the partition is along the time domain, it is necessary for setting pilots at the edge of frequency domain of the partitioned area in advance, and then considering to set the pilot signal at the edge of time domain. It is because that, if the partition is along the frequency domain, the edges of frequency domains of two adjacent areas are adjacent; if a pilot signal is first set at the edge of the frequency domain, it is possible to cause that the pilot distance of the edge of frequency domain of the adjacent areas is closer to each other, which is not in favor of complying with the time-frequency balancing principle, and vice versa.

Figure 5:
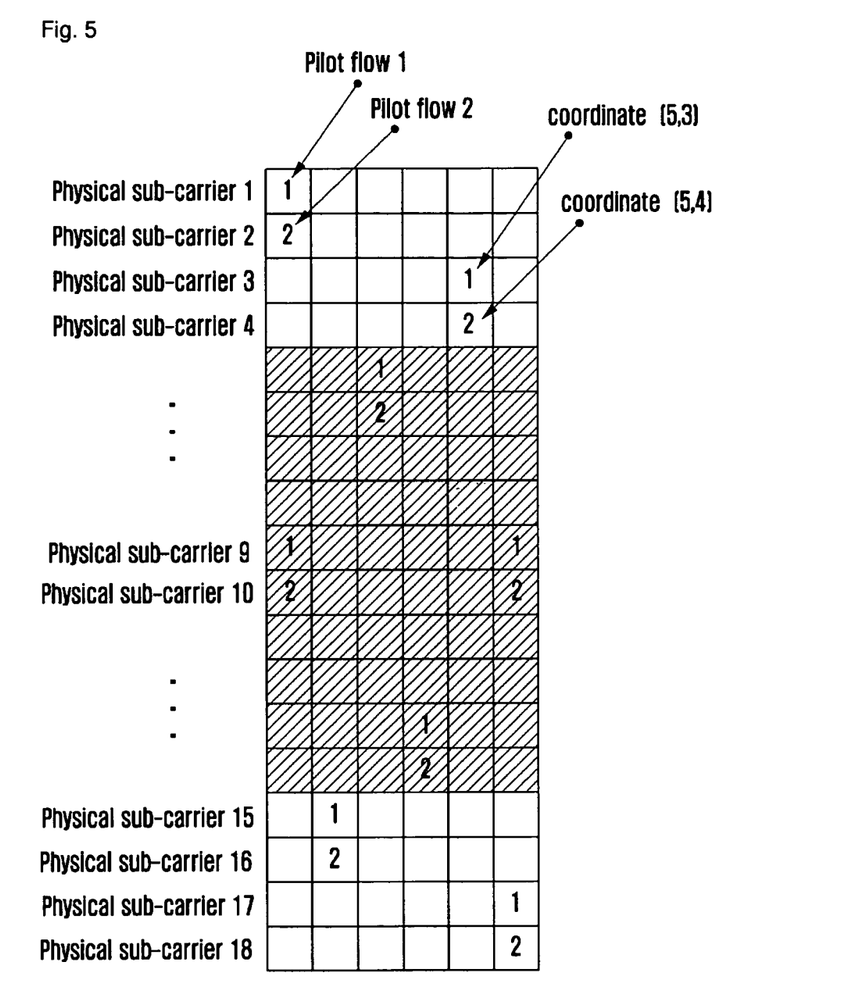
FIG. 5 is a schematic diagram illustrating a pilot format when a wireless time-frequency transmission block is composed of six consecutive OFDM symbols in time domain and eighteen consecutive physical sub-carriers in frequency domain in accordance with a first embodiment of the present invention.

After the edges of wireless time-frequency transmission blocks or the partitioned areas are set pilot signals, the furthers appropriate position will be selected according to the time-frequency domain balancing principle. The appropriate position may be the center of area or one time edge. If it is the center of area, the further appropriate position is one time edge of area, then the yet further appropriate position is two time edge of area, and then the yet further appropriate position is three time edge of area, and so on; if it is one time edge of area, the further appropriate position may be the center of area or two time edge of area, and so on, until all positions of pilot signals are determined. The I time edge in the present invention, wherein I is an integer not less than 1, is directed to the position a pilot width more closer to the center of wireless time-frequency transmission block or area than the I−1 time edge of the same domain (i.e. time domain or frequency domain); the edge of area is equal to 0 time edge of area. For example, referring to FIG. 5, 1 time edge of the wireless time-frequency transmission block at the time domain is directed to column 2 or 5 while at the frequency domain is directed to rows 3-4 or 15-16; it is because that, one pilot in FIG. 5 is a pair of pilots of which the width at the frequency domain is 2. The description and agreement of a pilot refers to embodiments.

In addition, if a pilot signal is set at the corner of the desired area, i.e. the intersection point of the edge of time domain and the edge of frequency domain, it can be regarded that the pilot signal is set both at the edge of time domain and at the edge of frequency domain. There are many such cases at the area adjacent to the edge of wireless time-frequency transmission block.

Figure 6:
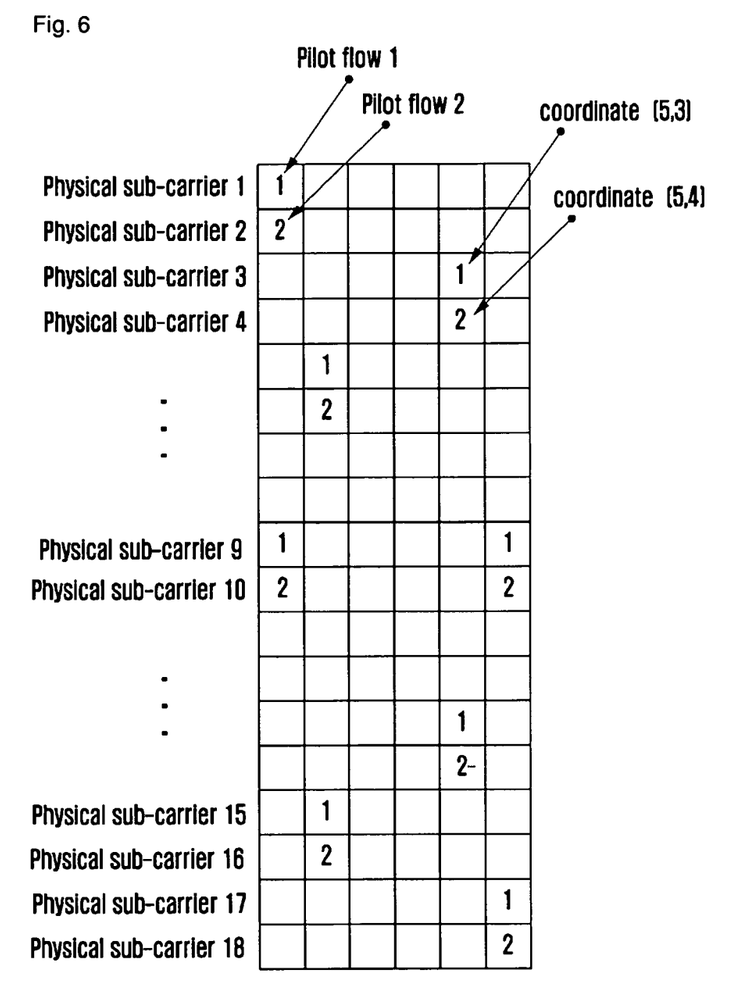
FIG. 6 is a schematic diagram illustrating a pilot format when a wireless time-frequency transmission block is composed of six consecutive OFDM symbols in time domain and eighteen consecutive physical sub-carriers in frequency domain in accordance with a second embodiment of the present invention.
Figure 9:
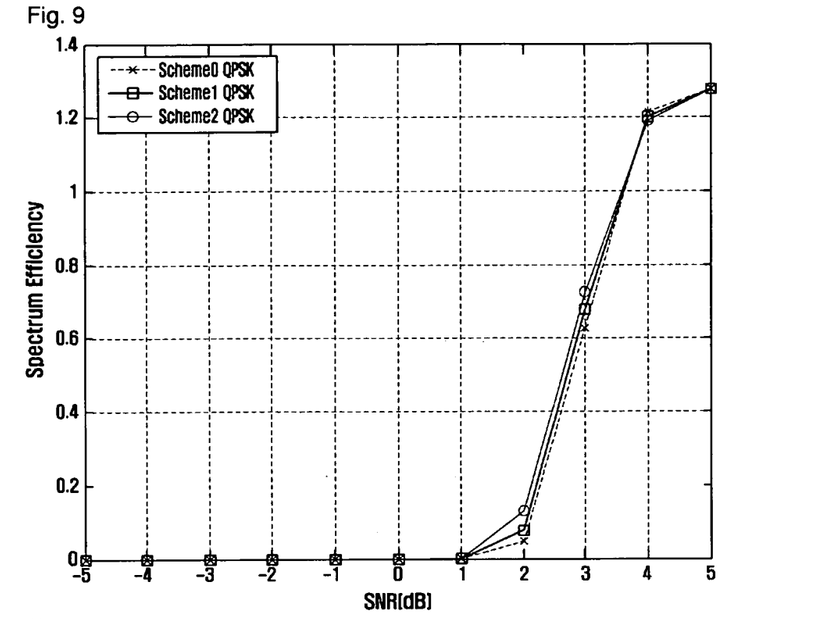
FIGS. 9 and 10 are schematic diagrams of simulation results according to the method of the present invention.

In addition, in a wireless time-frequency transmission block or partitioned area, it can achieve better effect that a pilot signal is set according to the self-imaging method. That is to say, after a pilot signal of one side of time domain and frequency domain is set, the position, in which the pilot signal resides at the corresponding side, may be got immediately according to the self-imaging method. As described above, since the partitioned area has symmetry, it can be implemented completely that a pilot signal is set according to the self-imaging method. A pilot signal is set according to the method, which may benefit from simplifying the process and reducing the implementing complexity. FIG. 9 is a curve diagram illustrating the spectrum efficiency got in the case that multiple shared frequency base stations send pilot signals at two antennas at the same time; the data modulating method is QPSK; scheme 0 is as shown in FIG. 3(*d*), scheme 1 is as shown in FIG. 6, and scheme 2 is as shown in FIG. 5. It can be seen from the simulation result of FIG. 9 that, the spectrum efficiencies of embodiments got according to the self-imaging method as shown in FIGS. 5 and 6, i.e. schemes 2 and 1, are higher than that of the existing scheme got without according to the self-imaging method as shown in FIG. 3(*d*), i.e. scheme 0, i.e. schemes 2 and 1 have the better performance. In fact, embodiments of FIG. 5 and FIG. 6 are got according to the time-frequency domain self-imaging method.

It should be noted that, the self-imaging method of the present invention includes the following three self-imaging methods of: time domain self-imaging method, frequency domain self-imaging method and time-frequency domain self-imaging method. On using a self-imaging method, it may not be always identical in the whole wireless time-frequency transmission block, i.e. after a wireless time-frequency transmission block is partitioned into several areas, the different self-imaging methods may be used in the different areas. Certainly, in individual cases, self-imaging methods may also be used in parts of areas while self-imaging methods are not used in other parts of areas. For example, in the case of partitioning into three areas, the time-frequency domain self-imaging method is used in the first area, the frequency domain self-imaging method is used in the second area, and no self-imaging method is used in the third area.

It should be noted that, in the above mentioned three self-imaging methods.

The time domain self-imaging method is directed to take the central axis of the time domain of a wireless time-frequency transmission block as symmetry axis, and find the positions of minimal time-frequency cell-grids symmetrical to the currently-got positions of pilot signals relative to the symmetry axis, of which the number is the same as that of the currently-got positions of pilot signals. For example, referring to FIG. 5, antenna 1 transmits a pilot at (1,1) of wireless time-frequency transmission block while antenna 2 transmits a pilot at (1,2) of wireless time-frequency transmission block; for such a pair of pilot signals, the same number positions of minimal time-frequency cell-grids symmetrical relative to the central axis of the time domain are (6,1) and (6,2). As long as the centers of such two pairs of pilot signals are symmetrical relative to the central axis of the time domain, that is to say, the minimal time-frequency cell-grid (6,1) corresponds to antenna 1 and the minimal time-frequency cell-grid (6,2) corresponds to antenna 2, i.e. the relative position of antenna 1 and antenna 2 is unchanged; alternatively, the cell-grid (6,1) may correspond to antenna 2 and the cell-grid (6,2) may correspond to antenna 1, i.e. the relative position of antenna 1 and antenna 2 is changed. Certainly, from a symmetry perspective, it is generally a preferred design that the relative position of various antennas is unchanged.

The frequency domain self-imaging method is directed to take the central axis of the frequency domain of a wireless time-frequency transmission block as symmetry axis, and find the positions of minimal time-frequency cell-grids symmetrical to the currently-got positions of pilot signals relative to the symmetry axis, of which the number is the same as that of the currently-got positions of pilot signals. For example, referring to FIG. 8, antenna 1 transmits a pilot at (3,5) of wireless time-frequency transmission block while antenna 2 transmits a pilot at (3,6) of wireless time-frequency transmission block; antenna 3 transmits a pilot at (4,5) of wireless time-frequency transmission block while antenna 4 transmits a pilot at (4,6) of wireless time-frequency transmission block; for such a group of pilot signals, the same number positions of minimal time-frequency cell-grids symmetrical relative to the central axis of the frequency domain are (3,13), (3,14), (4,13) and (4,14). As long as the centers of such a group of pilot signals are symmetrical relative to the central axis of the frequency domain, that is to say, similar to the above described time domain self-imaging method, the minimal time-frequency cell-grids (3,13), (3,14), (4,13) and (4,14) are used for transmitting antennas 1-4, and the relative position is not required, i.e. any one position of (3,13), (3,14), (4,13) and (4,14) may transmit pilot signals of any one antenna of antennas 1-4. Certainly, from a symmetry perspective, it is generally a preferred design that the relative position of various antennas is unchanged.

The time-frequency domain self-imaging method is directed to take the intersection point of the central axis of the time domain and the central axis of the frequency domain of a wireless time-frequency transmission block as origin, and find the positions of minimal time-frequency cell-grids symmetrical to the currently-got positions of pilot signals relative to the origin, of which the number is the same as that of the currently-got positions of pilot signals. For example, referring to FIG. 8, antenna 1 transmits a pilot at (1,1) of wireless time-frequency transmission block while antenna 2 transmits a pilot at (2,1) of wireless time-frequency transmission block; antenna 3 transmits a pilot at (3,1) of wireless time-frequency transmission block while antenna 4 transmits a pilot at (4,1) of wireless time-frequency transmission block; for such a group of pilot signals, the same number positions of minimal time-frequency cell-grids symmetrical relative to the intersection point of the central axis of the time domain and the central axis of the frequency domain are (3,18), (4,18), (5,18) and (6,18). As long as the centers of such a group of pilot signals are symmetrical relative to the intersection point of the central axis of the time domain and the central axis of the frequency domain, that is to say, similar to the above described time domain self-imaging method, the minimal time-frequency cell-grids (3,18), (4,18), (5,18) and (6,18) are used for transmitting antennas 1-4, and the relative position is not required, i.e. any one position of (3,18), (4,18), (5,18) and (6,18) may transmit pilot signals of any one antenna of antennas 1-4; as shown in FIG. 8, the minimal time-frequency cell-grids (3,18), (4,18), (5,18) and (6,18) respectively transmit pilot signals of antennas 2, 3, 1 and 4. Certainly, from a symmetry perspective, it is generally a preferred design that the relative position of various antennas is unchanged, i.e. the minimal time-frequency cell-grids (3,18), (4,18), (5,18) and (6,18) respectively transmit pilot signals of antennas 1, 2, 3 and 4.

In accordance with the method provided by the present invention, the detailed implementing process of the present invention is hereinafter described in detail by taking several embodiments for example.

Embodiment 1:

In embodiment 1 of the present invention, a wireless time-frequency transmission block has any format composed of N consecutive OFDM symbols in time domain and M consecutive physical sub-carriers in frequency domain, N and M are integers those are greater than or equal to 1; the wireless time-frequency transmission block with any format is partitioned into several areas; the sum of several areas is the wireless time-frequency transmission block and the several areas are mutually disjoint; when a pilot signal is set in each area, the position is determined according to the time-frequency domain balancing principle of pilot signals of various antennas in various areas and preferentially according to the time-frequency domain balancing principle of the area; when a wireless time-frequency transmission block is transmitted, a pilot signal of each antenna is inserted at the pilot signal position corresponding to the antenna for transmission.

Figure 2:
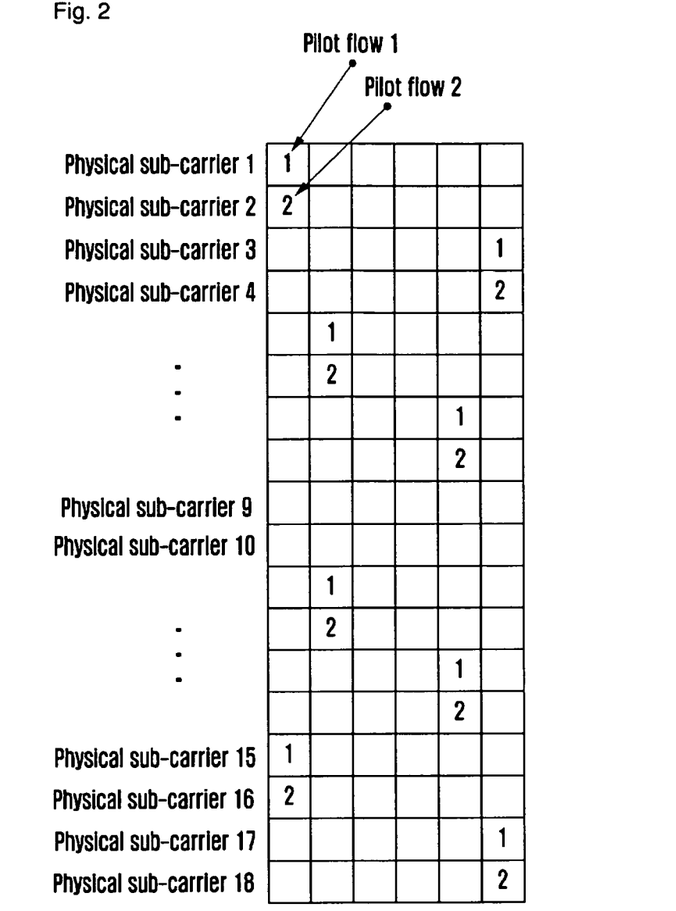
FIG. 2 is a pilot transmission scheme in the prior art.

When pilot signal positions of various antennas are determined by use of the method of the present invention, it is necessary for referring to the flowchart of embodiment 1 as shown in FIG. 2, the partitioned area schematic diagram as shown in FIG. 5 and a pilot format schematic diagram as shown in FIG. 5. In the embodiment 1, the process for designing the pilot format and transmitting pilot signals in a multi-carrier wireless transmission system may includes the following steps:

Step 401: partitioning a wireless time-frequency transmission block into several areas.

In this embodiment, a wireless time-frequency transmission block is composed of N consecutive OFDM symbols in time domain and M consecutive physical sub-carriers in frequency domain. For example, referring to FIG. 5, by taking the value of N is 6 and the value of M is 18 for example, since M is triple as much as N, and obviously greater than N, the partition is performed along the frequency domain. In this step, a wireless time-frequency transmission block is partitioned into two areas. An area is the area with slashes as shown in FIG. 5, i.e. the rectangle area determined by two minimal time-frequency cell-grids with coordinate (1,5) and coordinate (1,5) in the lower right corner, which is referred to as area 2; the rest minimal time-frequency cell-grids of row 8 column 6 construct another area, which is referred to as area 1. Two areas have symmetry in frequency domain; certainly, the processing of this step may also applicable to other values of N and M, for example, when the value of N is 11 and the value of M is 5, N is obviously greater than M, the partition is performed along the time domain in this step, a wireless time-frequency transmission block is partitioned into two areas; as shown in FIG. 5, area 2 is the area with slashes in FIG. 5 while area 1 is the area without slashes in FIG. 5.

Step 402: determining the number of pilot signal position of various areas according to the number of minimal time-frequency cell-grid of various areas and the position in wireless time-frequency transmission block. The total number of pilot signal position of various areas is a preset number.

A detailed implementing process of this step is that, in a multi-carrier mobile communication system, to implement a desired service transmitted by multiple antennas, eight pilot signals are sent at each antenna in the wireless time-frequency transmission block of rows 18 columns 6 by considering the transmission throughput and the accuracy of channel estimation accuracy; and pilot signals are planed to be transmitted at Q antennas at most. In FIG. 5, supposing Q is 2. That is to say, in the wireless time-frequency transmission: block, at a time, eight pilot signals or eight pairs of pilot signals are sent.

The pilot of the present invention may be a pilot, a pair of pilot or a group (greater than two) of pilot. The wireless resources or minimal time-frequency cell-grids occupied by the pair or group of pilots are consecutive physically. In general, each resource unit of the physically-consecutive wireless resource is used for transmitting signals by a different antenna. For example, in FIG. 5, when a pilot is set at the upper left of the transmission block, which is directed to that a pilot is set at (1,1), or a pair of pilots are set at (1,1) and (1,2); the pilot set at (1,1) may be transmitted by an antenna while the pilot set at (1,2) may be transmitted by another antenna. In a similar way, it may also be directed to that a pair of pilots are set at (1,1) and (2,1), i.e. transverse setting, or it may also be directed to that a group of pilots are set at (1,1), (2,1), (1,2) and (2,2), i.e. setting four pilots. To simplify the description, in the above setting, whether a pilot, a pair of pilots or a group of pilots are set, which is described by setting a pilot in the present invention.

That is to say, the practical resource occupied by the pilot signal position in the present invention relates to the pilot number to be set at each pilot signal position. If only one pilot is set at a pilot signal position, it is necessary for one minimal time-frequency cell-grid; if a pair of pilots are set at a pilot signal position, it is necessary for two minimal time-frequency cell-grids; if a group of pilots, of which the number is n, are set at a pilot signal position, it is necessary for n minimal time-frequency cell-grids.

In FIG. 5, since the ratio of the number of minimal time-frequency cell-grids of area 1 and area 2 is 4:5, closer to 1:1, while two areas are in the inner and outer layer relation at the frequency domain in the wireless time-frequency transmission block. When the pilot signals are further set, the pilot signals are dispersed to such two areas according to the proportion of 1:1 by considering the time domain and the frequency domain. For example, eight pilot signals are dispersed to such two areas according to the proportion of 1:1, i.e. four pilot signals are assigned to each area.

It should be noted that, the above described method of assigning pilot signals to be transmitted, of which the total number is a preset value, to the partitioned various areas is a preferred embodiment of the present invention; in practical service implementation, other assigning method may also be adopted; for example, four of ten pilot signals to be transmitted are assigned to area 1, the reset six pilot signals are assigned to area 2; alternatively, six pilot signals are assigned to area 1, and the reset four pilot signals are assigned to area 2.

Step 403: determining the position of pilot signals, of which the total number is a preset number, according to the time-frequency domain balancing principle of pilot signals of various antennas in various areas.

Preferably, when the position of a pilot signal is set in each area, the position of pilot signal is first determined according to the time-frequency balancing principle of pilot signals of various antennas in the area, and then determined according to the time-frequency balancing principle of other various areas.

In accordance with the description of step 402, four pilot signals are assigned in each area. As described above, on the premise of considering the time-frequency balancing principle of pilot signal, it is set at the edge preferentially when a pilot signal is set in area 1. Since the embodiment is partitioned along the frequency domain, it is necessary for setting the pilot signal at the edge of time domain of the partitioned area first, and then considering setting the pilot signal, at the edge of frequency domain of the partitioned area; since area 1 is an area more closer to the edge of wireless time-frequency transmission block, as described above, to reduce the extrapolation of channel estimation and consider the importance of area edge, a pilot signal may be set at the corner of area 1, i.e. the intersection point of the edge of time domain and the edge of frequency domain. Without loss of generality, a pilot may be set at the top left corner of area 1. Considering the frequency domain symmetry of area 1, another pilot signal may be set at the bottom of area 1, i.e. the lower right corner of rows 15-18 in FIG. 5. At this time, it is regarded that the edge of time domain and the edge of frequency domain of area 1 are set pilot signals. Afterwards, a further appropriate position is selected according to the time-frequency domain balancing principle. The appropriate position may be the center of area or one time edge. Through observation, it can be seen that, the center of area 1 is closer to the edge of area 2; the further appropriate position can be 1 time edge of area 1 by considering the time-frequency domain balancing principle of other areas. At the bottom of area 1, there are tow optional 1 time edge, one is positions (2,15) and (2,16); another one is positions (5,15) and (5,16). Obviously, considering the time-frequency balancing principle of the area, especially the pilots can't be too dense; it is determined that the pilot signal position should be at positions (2,15) and (2,16).

In a similar way, in area 2, since the embodiment is partitioned along the frequency domain, it is necessary for first setting a pilot signal at the edge of time domain of area 2, and then considering setting the pilot signal at the edge of frequency domain of area 2. For the edge of time domain, when it is necessary for setting a pilot signal at column 1, the pilot signal should be set at a position adjacent to the center of frequency domain of column 1, for example setting it at (1,9) and (1,10), by considering that pilot signals are set at (1,1), (1,2), (2,15) and (2,16) of area 1 and considering the time-frequency balancing principle of various areas. In a similar way, the setting at column 6 is similar to the above description. Then, it is considered to set the pilot signal at the edge of frequency domain. For the edge of the frequency domain of area 2, when it is necessary for setting a pilot signal at columns 5-6, the pilot signal should be set at column 2 or 3 by considering that pilot signals are set at (1,1), (1,2), (5,3) and (5,4) of area 1, considering that pilot signals are set at (1,9) and (1,10) of area 2, and considering the time-frequency balancing principle of various areas. As described above, in accordance with the present invention, a pilot signal is set at the edge preferentially on the premise of considering the time-frequency domain balancing principle of pilot signals; that is to say, the present invention considers both the time-frequency domain balancing principle and setting a pilot signal at the edge preferentially. For these two considerations, when it is expected to consider the time-frequency domain balancing principle even more, i.e. it is desired that pilot signals are distributed more symmetrically in the time-frequency domain, the pilot position should be determined at (3,5) and (3,6). It is because that, in the time domain, four pilot signals are set at the edge of time domain of wireless time-frequency transmission block, two pilot signals are set at 1 time edge of the time domain of wireless time-frequency transmission block, but no pilot signal is set at the third and fourth OFDM symbols, i.e. the setting is very asymmetrical. In a similar way, the setting at rows 13-14 of area 2 is similar to the above description; the pilot position should be determined at (4,13) and (4,14). Certainly, it is preferred method for determining the pilot position at (4,13) and (4,14); according to the present invention, the pilot position may also be determined at (5,13) and (5,14).

In this embodiment, pilot signals are set at the edge, 1 time edge and 2 time edge successively, the advantage of which is to reduce the usage of extrapolation algorithm; obviously, it is in favor of providing the accuracy of channel estimation and reducing the implementing complexity.

Another advantage for setting pilot signals according to the above scheme is that, no pilot signal is transmitted at OFDM symbol 3 or 4, which is advantageous for a wireless time-frequency transmission block reducing or increasing signals along the time axis; the signals may be reduced at the center of wireless time-frequency transmission block or increased at the head and the tail of OFDM symbols; that is to say, the relative position of the existing pilot signals is not changed for reducing or increasing signals while the relative distances of the existing pilot signals may be changed. It is in favor of simplifying the process for sending or receiving a pilot signal and the receiving algorithm.

In addition, referring to FIG. 2, the difference of this embodiment is that, step 403 is not performed, it is because that, the position of pilot signals, of which the total number is a preset number, is not determined according to the time-frequency domain balancing principle of pilot signals of various antennas in various areas. That is to say, in two areas as shown in FIG. 5, the positions of pilot signals in area 1 are at the edge of the time domain while the positions of pilot signals in area 2 are not at the edge of the time domain, which does not comply with the time-frequency domain balancing principle of pilot signals in various areas. It can be seen from the following simulation result that, the performance of the present invention is better than that of FIG. 2.

Step 404: further, determining pilot positions in at least one area according to the self-imaging method. The step is optional.

An embodiment is that, the pilot signal positions of another side are determined according to the self-imaging method after the pilot signal positions of one side in the time domain or the frequency domain are determined in step 403.

Referring to FIG. 5, for example, after the pilot signal positions are assigned at (1,1) and (1,2), the pilot signal positions of another side may be determined according to the time-frequency domain self-imaging method, i.e. the pilot signal positions are determined at (6,17) and (6,18). In a similar way, after the pilot signal positions are determined at (1,9) and (1,10), the pilot signal positions of another side may be determined according to the time-frequency domain self-imaging method, i.e. the pilot signal positions are determined at (6,9) and (6,10).

The self-imaging method may also be used for only determining the positions of parts of pilot signals.

In the present invention, the imaging property between pilot flows may reduce the implementing complexity; it is because that, the imaging causes the corresponding co-efficients are similar or identical. Moreover, if a pilot flow is generated by use of the self-imaging method, the pilot flow may possess some self-imaging properties, which is similar to the imaging property between pilot flows; in a similar way, it may also reduce the implementing complexity.

The above imaging property between pilot flows is directed to a position property between two pilot flows including time domain imaging property, frequency domain imaging property and time-frequency domain imaging property. Two pilot flows possess time domain imaging property, which is detected to take the central axis of the time domain of a wireless time-frequency transmission block as symmetry axis, and minimal time-frequency cell-grids of a pilot flow symmetrical relative to the symmetry axis all belong to another pilot flow; two pilot flows possess frequency domain imaging property, which is detected to take the central axis of the frequency domain of a wireless time-frequency transmission block as symmetry axis, and minimal time-frequency cell-grids of a pilot flow symmetrical relative to the symmetry axis all belong to another pilot flow; two pilot flows possess time-frequency domain imaging property, which is detected to take the intersection point of the central axis of the time domain and the central axis of the frequency domain of a wireless time-frequency transmission block as origin; and minimal time-frequency cell-grids of a pilot flow symmetrical relative to the origin all belong to another pilot flow.

Step 405: inserting pilots of each antenna at the pilot signal position corresponding to the antenna for transmission when it is necessary for transmitting a wireless time-frequency transmission block.

Embodiment 2:

When pilot signal positions of various antennas are determined by use of the method of the present invention, it is necessary for referring to the flowchart of embodiment 2 as shown in FIG. 2, the partitioned area schematic diagram as shown in FIG. 5 and a pilot format schematic diagram as shown in FIG. 6. In the embodiment 2, the process for designing the pilot format and transmitting pilot signals in a multi-carrier wireless transmission system may includes the following steps.

All descriptions of steps 401, 402, 404 and 405 are the same as those of embodiment 1.

Step 403: the difference from step 403 of embodiment 1 is that, for the edge of the frequency domain of area 2, when it is necessary for setting a pilot signal at columns 5-6, the pilot signal should be set at column 2 or 3 by considering that the pilot signal positions are set at (1,1), (1,2), (5,3) and (5,4) of area 1, considering that pilot signals are set at (1,9) and (1,10) of area 2, and considering the time-frequency balancing principles of various areas. As described above, the present invention considers both the time-frequency domain balancing principle and setting a pilot signal at the edge preferentially. For these two considerations, when it is expected to consider setting a pilot signal at the edge preferentially even more, for example, in this step, it is desired to set at the edge of time domain even more to reduce the extrapolation at the time domain, the pilot position should be determined at (2,5) and (2,6). In a similar way, the setting at rows 13-14 of area 2 is similar to the above description; the pilot position should be determined at (5,13) and (5,14). Certainly, it is preferred method for determining the pilot position at (5,13) and (5,14); according to the present invention, the pilot position may also be determined at (4,13) and (4,14).

Figure 7:
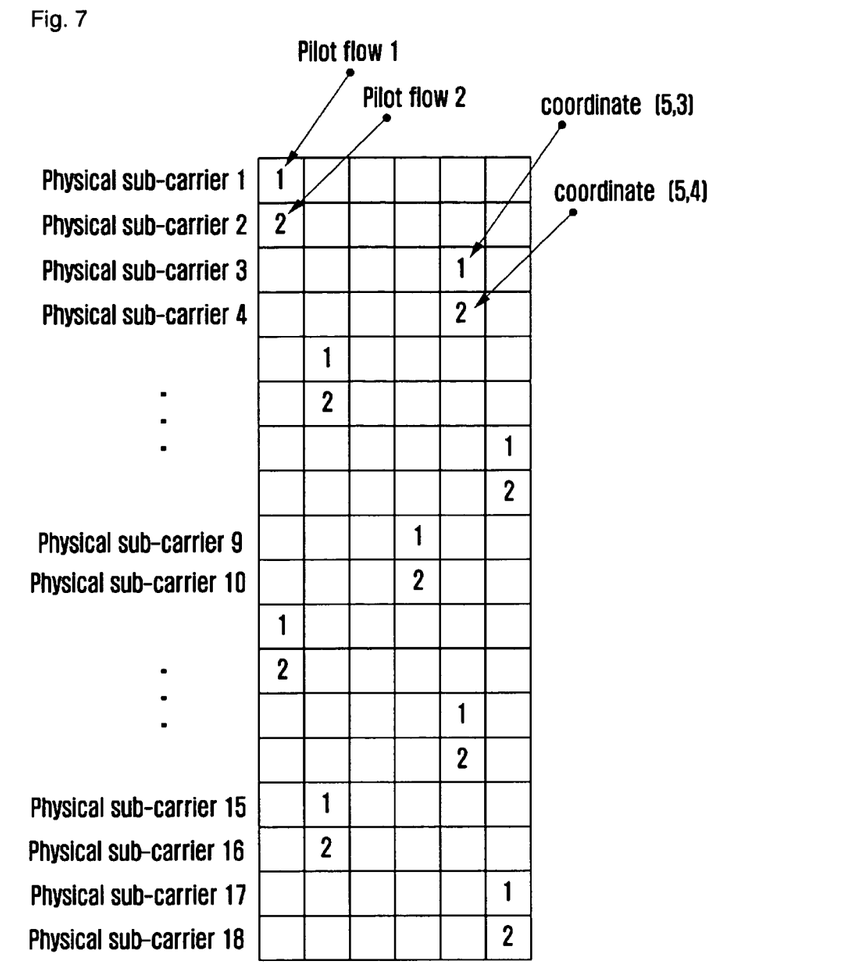
FIG. 7 is a schematic diagram illustrating a pilot format when a wireless time-frequency transmission block is composed of six consecutive OFDM symbols in time domain and eighteen consecutive physical sub-carriers in frequency domain in accordance with a third embodiment of the present invention.

Embodiment 3:

When pilot signal positions of various antennas are determined by use of the method of the present invention, it is necessary for referring to the flowchart of embodiment 3 as shown in FIG. 12, the partitioned area schematic diagram as shown in FIG. 5 and a pilot format schematic diagram as shown in FIG. 7. In the embodiment 3, the process for designing the pilot format and transmitting pilot signals in a multi-carrier wireless transmission system may includes the following steps.

All descriptions of step 401 are the same as those of embodiment 1.

Step 402: the difference from step 402 of embodiment 1 is that, nine pilot signals are sent at each antenna in the wireless time-frequency transmission block of rows 18 columns 6 by considering the transmission throughput and the accuracy of channel estimation accuracy; and pilot signals are planed to be transmitted at Q antennas at most.

In FIG. 7, since the ratio of the number of minimal time-frequency cell-grids of area 1 and area 2 is 4:5, while two areas are in the inner and outer layer relation at the frequency domain in the wireless time-frequency transmission block. When the pilot signals are further set, the pilot signals are dispersed to such two areas according to the proportion of 4:5 by considering the time domain and the frequency domain. For example, four of nine pilot signals are assigned to area 1 while another five pilot signals are assigned to area 2.

Step 403: when the position of a pilot signal is set in each area, the position of pilot signal is first determined according to the time-frequency balancing principle of pilot signals of various antennas in the area, and then determined according to the time-frequency balancing principle of other various areas.

The difference of step 403 from step 403 of embodiment 2 is that,

According to the description of step 402, four of nine pilot signals are assigned to area 1 while another five pilot signals are assigned to area 2. As described above, on the premise of considering the time-frequency domain balancing principle of pilot signals, all descriptions for determining the pilot signal positions in area 1 are the same as those of embodiment 2.

In area 2, since the embodiment is partitioned along the frequency domain, it is necessary for first setting pilots at the, edge of time domain of area 2, and then considering setting the pilot signal at the edge of frequency domain of area 2. For the edge of time domain, when it is necessary for setting pilots at column 1, the pilot signal should be set at a position adjacent to the center of frequency domain of column 1, for example setting it at (1,11) and (1,12), by considering that pilot signals are set at (1,1), (1,2), (2,15) and (2,16) of area 1, considering the time-frequency balancing principle of area 2, i.e. a pilot may be set at the center of area 2, and considering the time-frequency balancing principle of various areas. In a similar way, the setting at column 6 is similar to the above description. Then, it is considered to set the pilot signal at the edge of frequency domain. For the edge of the frequency domain of area 2, when it is necessary for setting pilots at columns 5-6, the pilot signal should be set at column 2 or 3, for example it is desired that pilot signals are distributed more symmetrically in the time-frequency domain for reducing the extrapolation, the pilot position should be set at (2,5) and (2,6), by considering that pilot signals are set at (1,1), (1,2), (5,3) and (5,4) of area 1, considering that pilot signals are set at (1,11) and (1,12) of area 2, and considering the time-frequency balancing principle of various areas. In a similar way, the setting at rows 13-14 of area 2 is similar to the above description.

Step 404: in the above step, i.e. the pilot signal positions of another side are determined according to the self-imaging method after the pilot signal positions of one side in the time domain or the frequency domain are determined in step 403.

Referring to FIG. 7, for example, after the pilot signal positions are assigned at (1,1) and (1,2), the pilot signal positions of another side may be determined according to the time-frequency domain self-imaging method, i.e. the pilot signal positions are determined at (6,17) and (6,18). In a similar way, after the pilot signal positions are determined at (1,11) and (1,12), the pilot signal positions of another side may be determined according to the time-frequency domain self-imaging method, i.e. the pilot signal positions are determined at (6,7) and (6,8).

It should be noted that, the pilot signal positions of another side are not determined according to the self-imaging method after the pilot signal positions of one side in the time domain or the frequency domain are determined in this step. For example, for pilot (4,9) and (4,10) at the center of area 2, the corresponding pilot signal positions are not determined according to the self-imaging method.

All descriptions of step 405 are the same as those of embodiment 1.

The advantage of FIG. 5 comparing with FIGS. 6 and 7 is that, no pilot signal is transmitted at OFDM symbols 3 and 4, which is advantageous for a wireless time-frequency transmission block shortening to 5 OFDM symbols or increasing to 7 OFDM symbols; the relative position of the existing pilot signals is not changed; the signals may be reduced at OFDM symbol 3 or 4, or increased before OFDM symbol 1 or after OFDM symbol 7 (at the right of OFDM symbol 6).

Figure 10:
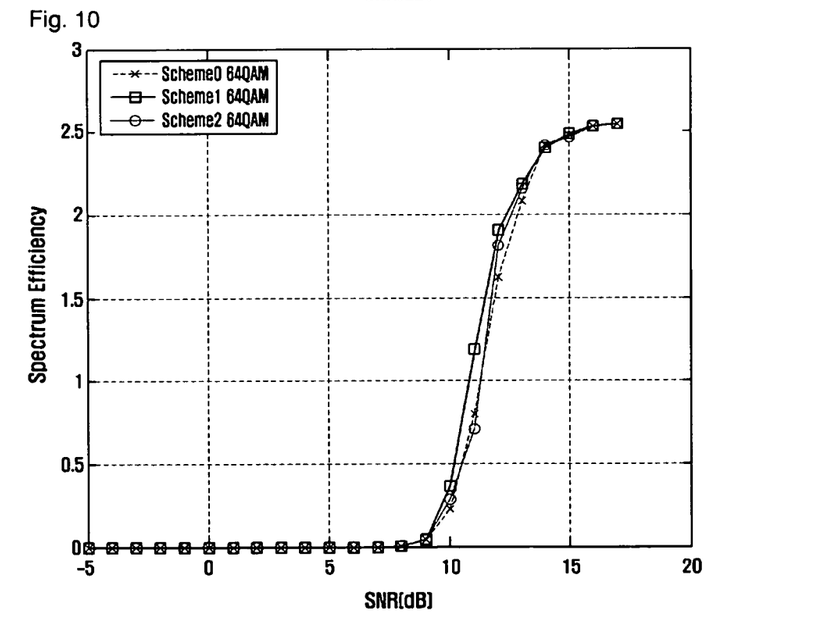

FIG. 10 is a curve diagram illustrating the spectrum efficiency got in the case that multiple shared frequency base stations send pilot signals at two antennas at the same time; the data modulating method is 64QAM; scheme 0 is as shown in FIG. 2, scheme 1 is as shown in FIG. 6, and scheme 2 is as shown in FIG. 5. It can be seen from the simulation result of FIG. 10 that, the spectrum efficiencies of embodiments got by the method for determining the pilot signal position according to the time-frequency domain balancing principle of pilot signals of various antennas in various areas as shown in FIGS. 5 and 6, i.e. schemes 2 and 1, are higher than that of the existing scheme got without according to the above method as shown in FIG. 2, i.e. scheme 0, i.e. schemes 2 and 1 have the better performance.

The multi-carrier wireless transmission system applied in the present invention may be any system adopting the multi-carrier wireless transmission technology, for example mobile WIMAX evolution system or LTE system. Wireless transmission services applied by the method of the present invention may be any wireless transmission services, which is not limited to a multicast broadcast services based on multi-cell of a shared frequency network or service of single or multiple antennas.

To sum up, the foregoing are only preferred embodiments of the present invention and are not for use in limiting the protection scope thereof. Any modification, equivalent replacement and improvement made under the spirit and principle of the present invention should be included the protection scope thereof.

The invention claimed is:

1. A method for transmitting pilots in a multi-carrier wireless transmission system, wherein a wireless time-frequency transmission block is composed of N consecutive OFDM symbols in a time domain and M consecutive physical sub-carriers in a frequency domain, and wherein N and M are integers greater than or equal to 1, the method comprising:
determining whether M is greater than N or not;
partitioning the wireless time-frequency transmission block into several areas along the frequency domain when M is greater than N, and along the time domain when N is greater than M;
determining, for each of a plurality of antennas, pilot positions in the partitioned areas of a preset number of pilots based on a time-frequency domain balancing principle; and
inserting the pilots for each antenna at the determined pilot positions in the partitioned areas for transmission.

2. The method of claim 1, wherein partitioning the wireless time-frequency transmission block into several areas further comprises: partitioning the wireless time-frequency transmission block so that the partitioned areas have symmetry.

3. The method of claim 1, wherein the partitioned areas are closer to square than the wireless time-frequency transmission block.

4. The method of claim 1, wherein the time-frequency balancing principle comprises, for each partitioned area, a time-frequency balancing principle of pilots of the antennas in the area and pilots of the antennas in the other areas.

5. The method of claim 1, further comprising, before determining the pilot positions, determining a number of pilot positions of each area according to a number of minimal time-frequency cell-grids of the areas and positions of the areas in the wireless time-frequency transmission block.

6. The method of claim 1, wherein determining the pilot positions comprises: determining the pilot positions at edges of the areas.

7. The method of claim 6, further comprising:
if the partition is along the frequency domain, determining pilot positions at an edge of the time domain of the partitioned area and afterwards determining pilot positions at an edge of the frequency domain; and
if the partition is along the time domain, determining pilot positions at the edge of the frequency domain of the partitioned area and afterwards determining pilot positions at the edge of the time domain.

8. The method of claim 7, further comprising: selecting further pilot positions according to the time-frequency balancing principle after the pilot positions are determined at the edges of the partitioned areas.

9. The method of claim 8, wherein at least a subset of the further pilot positions are at a center of each area.

10. The method of claim 1, wherein determining the pilot positions comprises: determining at least a subset of the pilot positions according to a self-imaging method.

11. The method of claim 10, wherein the self-imaging method comprises one of: a time domain self-imaging method, a frequency domain self-imaging method and a time-frequency domain self-imaging method, and wherein determining the pilot positions further comprises: for each area, determining the pilot positions by selecting one of the time domain self-imaging method, the frequency domain self-imaging method and the time-frequency domain self-imaging method.

12. The method of claim 11, wherein the wireless time-frequency transmission block is composed of six consecutive OFDM symbols in the time domain and eighteen consecutive physical sub-carriers in the frequency domain, wherein the preset number of the pilots is 8, and wherein the pilot positions are at least one of the following two groups:
$\{(1,1), (5,3), (3,5), (1,9), (6,9), (4,13), (2,15), 6,17)\}$ and
$\{(1,2), (5,4), (3,6), (1,10), (6,10), (4,14), (2,16), (6,18)\}$,
wherein a first digit of each pilot position represents a coordinate of the time domain and a second digit of each pilot position represents a coordinate of the frequency domain.

13. The method of claim 11, wherein the wireless time-frequency transmission block is composed of six consecutive OFDM symbols in the time domain and eighteen consecutive physical sub-carriers in the frequency domain, wherein the preset number of the pilots is 8, and wherein the pilot positions are at least one of the following two groups:
$\{(1,1), (5,3), (2,5), (1,9), (6,9), (5,13), (2,15), 6,17)\}$ and
$\{(1,2), (5,4), (2,6), (1,10), (6,10), (5,14), (2,16), (6,18)\}$,
wherein a first digit of each pilot position represents a coordinate of the time domain and a second digit of each pilot position represents a coordinate of the frequency domain.

14. The method of claim 1, wherein the number of pilots inserted at each pilot position is one or a physically-consecutive pair or multiple.

15. The method of claim 8, wherein, for a particular area, the further pilot positions are one of: at a center of the area and at 1 time edge of the area, wherein if the further pilot position is at the center of the area, a following further pilot position is at the 1 time edge of the area, a yet further pilot position is at a 2 time edge of the area, and a yet further pilot position is at a 3 time edge of the area, and so on, until all pilot positions are determined, and wherein if the further pilot position is at the 1 time edge of the area, the following further pilot position is one of: at the center of the area and at the 2 time edge of the area, and so on, until all pilot positions are determined.

16. A method for transmitting pilots in a multi-carrier wireless transmission system, wherein a wireless time-frequency transmission block is composed of N consecutive OFDM symbols in a time domain and M consecutive physical sub-carriers in a frequency domain, and wherein N and M are integers greater than or equal to 1, the method comprising:
determining whether M is greater than N or not;
partitioning the wireless time-frequency transmission block into a plurality of areas along the frequency domain when M is greater than N, and along the time domain when N is greater than M;
determining pilot positions in the partitioned areas for a first subset of pilots for each of a plurality of antennas based on a time-frequency domain balancing principle;
determining pilot positions in the partitioned areas for a second subset of pilots for each of the antennas based on a self-imaging method;
inserting the first subset of pilots for each antenna at the pilot positions determined based on the time-frequency domain balancing principle; and
inserting the second subset of pilots for each antenna at the pilot positions determined based on the self-imaging method.

17. The method of claim 16, further comprising, before determining the pilot positions, determining a number of pilot positions of each area based on a number of minimal time-frequency cell-grids of each area and positions of each area in the wireless time-frequency transmission block.

18. The method of claim 16, wherein the self-imaging method comprises one of: a time domain self-imaging method, a frequency domain self-imaging method and a time-frequency domain self-imaging method.

19. The method of claim 16, wherein the partitioned areas are closer to square than the wireless time-frequency transmission block.

20. The method of claim 16, wherein determining the pilot positions comprises: determining the pilot positions at edges of the areas.

* * * * *